Patented May 13, 1952

2,596,102

UNITED STATES PATENT OFFICE 2,596,102

PROCESS OF PREPARING CYCLOHEXENE

Hans F. Rickert, Leverkusen-Bayerwerk, Eberhard Stein, Leverkusen, and Otto Bayer, Leverkusen-Bayerwerk, Germany, assignors to Farbenfabriken Bayer, Leverkusen, Germany No Drawing. Application September 27, 1950, Serial No. 187,152. In Germany September 21, 1949

5 Claims. (Cl. 260—666)

The present invention relates to improvements in the manufacture of cyclohexene and more particularly it relates to improvements in the manufacture of cyclohexene by splitting off hydrogen halide from halogeno cyclohexane.

In accordance with prior art processes cyclohexene is prepared by splitting off hydrogen halide from chlorocyclohexane in which process liquid organic bases, such as pyridine, quinoline and others are used as catalysts. This kind of working has the disadvantage that at least the theoretical amount of catalyst has to be used.

In accordance with the present invention the splitting off of hydrogen halide from halogeno-cyclohexane is performed in the presence of carbazole and its C-substitution derivatives being of a more acid than basic nature. The process is carried out at higher temperatures, preferably at about 250–300° C. For the splitting off of the hydrogen halide only catalytical amounts are necessary. The reaction is performed at temperatures at which the liquid catalyst does not yet boil so that the reaction products can be distilled off continuously in admixture with unchanged starting material without it being necessary to use a device for separating the liquid catalyst. The carbazole and its C-substitution derivates such as halogeno carbazoles may be used directly but it is to be preferred to use them dissolved in an organic liquid boiling at a higher temperature, preferably at a temperature of more than 250° C.; such diluents are, e. g. diphenyl, anthracene, etc.

N-Alkyl carbazoles such as methyl-, ethyl- propyl- carbazole can also be used as diluents or as catalysts. The N-alkyl carbazoles are of much lower efficiency; the efficiency is increased only after a longer duration of reaction because of de-alkylation.

A very cheap liquid catalyst which is particularly suitable for technical purposes consists of waste products obtained in the purification of anthracene. These waste products consist of a yellowish mass melting above 180° C. and having a carbazole content of about 30%. The splitting off of hydrogen halide by means of this very cheap catalyst is effected in about the same manner as with a catalyst consisting of pure carbazole and N-ethyl carbazole as diluent.

The liquid catalyst is preferably cycled and the halogen-, for instance, chloro-cyclohexane is introduced in the gaseous form. The hydrogen halide split off escapes from the reaction vessel together with the cyclohexene produced containing small amounts of unreacted starting products. The hydrogen halide is washed out in the usual manner.

Friedel Craft's catalysts and metals yielding such catalysts by reaction with hydrogen halide must be avoided, since they possibly effect isomerisation.

The invention is further illustrated by the following examples without being restricted thereto.

Example 1

Through a vertically arranged tube which is filled with 1 kg. of a catalyst consisting of 70% of N-ethyl carbazole and 30% of carbazole, 100 g. of gaseous chloro-cyclohexane are introduced per hour at a temperature of the liquid catalyst of 270–300° C. The level of the contact in the tube through which the gas flows is 1 meter. At the upper end of the tube which has a wider diameter than the tube itself the reaction mixture is distilled off together with the hydrogen halide via a short ascending tube. After washing out by means of water the product is distilled in a 10-plate column. After first runnings of about 0.5%, the pure cyclohexene is obtained in a yield of about 75–80%. The residual part consists of unchanged chloro-cyclohexane which is re-introduced into the process. The yield of pure cyclohexene is about 92–95% calculated on the chlorocyclohexane used. The catalyst remains effective for at least 350 hours. Then it has become darker and more viscous owing to the carbonization of a small part of the chloro cyclohexane. It is advisable to renew part of the catalyst, or to purify it by distillation.

Example 2

If according to Example 1 100 g. of chloro-cyclohexane are passed through 1 kg. of a catalyst consisting of the wastes of the purification of anthracene and having a carbazole content of 30% equal yields are obtained as in Example 1. The catalyst is not consumed after 350 hours. It is, however, advisable to renew it at least partially. Regeneration of the catalyst by distillation which yields about 50% of useful liquid catalyst is possible, but not necessary because of the low price of the waste product. The consumed catalyst can be used for the manufacture of soot.

Example 3

When replacing the catalyst described in Example 1 consisting of a mixture of carbazole and N-ethyl carbazole by the same quantity by weight of 3.6-dichloro-carbazole the same yield is obtained as in Example 1 by processing in analogous manner.

We claim:

1. In the process of manufacturing cyclohexene the step which comprises heating a halogeno-cyclohexane in contact with a compound of the group consisting of carbazole, N-alkyl carbazoles and halogeno derivatives to a temperature at which hydrogen halide is split off from the halogeno-cyclohexane, and not in excess of the boiling temperature of said compound of the group consisting of carbazole, N-alkyl carbazole and halogeno derivatives.

2. Process as claimed in claim 1, in which the compound of the group consisting of carbazole, N-alkyl carbazoles and halogeno derivatives thereof is dissolved in a diluent boiling above about 250° C.

3. Process as claimed in claim 1, in which the temperature is between about 250° C. and 300° C.

4. In the process of manufacturing cyclohexene the step which comprises heating a halogeno-cyclohexane in contact with a carbazole containing waste product from the purification of anthracene to a temperature at which hydrogen halide is split off from the halogeno-cyclohexane.

5. Process as claimed in claim 4, in which the temperature is between about 250° C. and 300° C.

HANS F. RICKERT.
EBERHARD STEIN.
OTTO BAYER.

REFERENCES CITED

The following references are of record in the file of this patent:

UNITED STATES PATENTS

| Number | Name | Date |
| --- | --- | --- |
| 2,186,370 | Dosser | Jan. 9, 1940 |
| 2,204,565 | Britton et al. | June 18, 1940 |

OTHER REFERENCES

"Richters Organic Chemistry," Taylor, vol. II, (1939), Nordeman Pub. Co., New York, page 92.